(12) United States Patent
Sakai et al.

(10) Patent No.: US 9,528,652 B2
(45) Date of Patent: Dec. 27, 2016

(54) TRAVERSING INCORE PROBE VALVE SUPPORT AND TRAVERSING INCORE PROBE SYSTEM

(71) Applicant: Kabushiki Kaisha Toshiba, Minato-ku (JP)

(72) Inventors: Taito Sakai, Yokohama (JP); Tadashi Miyazaki, Yokohama (JP); Hidehiko Yasuta, Yokohama (JP); Masaharu Katsuta, Kawasaki (JP); Masashi Hirano, Yokohama (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 218 days.

(21) Appl. No.: 14/227,042

(22) Filed: Mar. 27, 2014

(65) Prior Publication Data

US 2014/0299724 A1    Oct. 9, 2014

(30) Foreign Application Priority Data

Apr. 4, 2013   (JP) ................................. 2013-078523

(51) Int. Cl.
*G21C 17/00* (2006.01)
*F16M 11/04* (2006.01)
*F16M 11/18* (2006.01)
*F16M 11/20* (2006.01)

(52) U.S. Cl.
CPC .......... *F16M 11/045* (2013.01); *F16M 11/048* (2013.01); *F16M 11/18* (2013.01); *F16M 11/2021* (2013.01)

(58) Field of Classification Search
CPC ...... F16M 11/045; F16M 11/048; F16M 11/18
USPC ....... 248/646, 651, 656, 657, 660, 669, 676; 376/245, 250, 255, 249, 258, 259
See application file for complete search history.

(56) References Cited

U.S. PATENT DOCUMENTS

| 2,242,722 | A | * | 5/1941 | Henry | ..................... | E21B 15/00 |
| | | | | | | 248/646 |
| 4,207,723 | A | * | 6/1980 | Hawke | ................... | G21C 17/06 |
| | | | | | | 376/203 |
| 4,604,027 | A | * | 8/1986 | Becker | ................ | H01L 21/6723 |
| | | | | | | 248/651 |

(Continued)

FOREIGN PATENT DOCUMENTS

JP    61-039559    2/1986

*Primary Examiner* — Terrell McKinnon
*Assistant Examiner* — Michael McDuffie
(74) *Attorney, Agent, or Firm* — Oblon, McClelland, Maier & Neustadt, L.L.P.

(57) ABSTRACT

According to an embodiment, a traversing incore probe valve support has: a valve bed fixed to a traversing incore probe valve provided in a traversing incore probe guide tube extending to outside of a reactor containment vessel; a stand provided on a floor surface outside the reactor containment vessel; and a displacement allowing member that connects the stand and valve bed in such a manner that they can be displaced in an axial direction of the traversing incore probe guide tube. The displacement allowing member may include: a lower slide rail fixed to the stand valve bed and having an upward contact surface; and an upper slide rail fixed to the valve bed and having a downward contact surface that can be slid in the axial direction of the traversing incore probe guide tube while contacting the upward contact surface.

4 Claims, 9 Drawing Sheets

(56) References Cited

U.S. PATENT DOCUMENTS

| | | | | | |
|---|---|---|---|---|---|
| 4,919,384 | A | * | 4/1990 | Grimberg | B23Q 9/0014 |
| | | | | | 248/646 |
| 4,953,418 | A | * | 9/1990 | Hirose | F16C 29/064 |
| | | | | | 108/143 |
| 5,145,637 | A | * | 9/1992 | Richardson | G01N 27/902 |
| | | | | | 376/245 |
| 5,204,053 | A | * | 4/1993 | Fennern | F04D 7/08 |
| | | | | | 376/267 |
| 5,311,791 | A | * | 5/1994 | Yanagisawa | B23Q 1/621 |
| | | | | | 108/143 |
| 5,436,944 | A | * | 7/1995 | Magnin | G21C 17/003 |
| | | | | | 376/249 |
| 5,519,741 | A | * | 5/1996 | Suzuki | G21C 17/01 |
| | | | | | 376/205 |
| 5,901,938 | A | * | 5/1999 | Mosca | B23K 26/10 |
| | | | | | 248/637 |
| 6,236,698 | B1 | * | 5/2001 | Hirukawa | G21C 17/108 |
| | | | | | 376/245 |
| 6,327,929 | B1 | * | 12/2001 | Yanagisawa | B23Q 1/017 |
| | | | | | 108/143 |
| 6,373,914 | B1 | * | 4/2002 | Gill | F28F 11/02 |
| | | | | | 376/203 |
| 8,371,025 | B2 | * | 2/2013 | Kramer | E04G 23/0218 |
| | | | | | 29/402.09 |
| 2004/0227534 | A1 | * | 11/2004 | Mueller | G01R 31/2891 |
| | | | | | 324/750.22 |
| 2009/0050782 | A1 | * | 2/2009 | Forster | F16C 29/00 |
| | | | | | 248/657 |

\* cited by examiner

TRAVERSING INCORE PROBE VALVE SUPPORT AND TRAVERSING INCORE PROBE SYSTEM

CROSS REFERENCE TO RELATED APPLICATION

This application is based upon and claims the benefit of priority from the prior Japanese Patent Application No. 2013-078523, filed in the Japanese Patent Office on Apr. 4, 2013, the entire content of which is incorporated herein by reference.

FIELD

The present invention relates to a traversing incore probe valve support that supports a traversing incore probe valve and a traversing incore probe system.

BACKGROUND

Typically, in a boiling water reactor, a traversing incore probe system (hereinafter, abbreviated as TIP) that moves a traversing probe in a calibration conduit installed in a reactor to measure neutron flux in the rector core. The calibration conduit is connected to a TIP guide tube outside the reactor. The TIP guide tube extends to outside of the primary containment vessel (hereinafter, abbreviated as PCV) and makes the traversing probe stand by outside the reactor at a time other than the measurement time.

Further, in the TIP guide tube outside the PCV, a traversing incore probe valve, such as an isolation valve or a check valve is provided. The traversing incore probe valve is desirably provided with a support to enhance earthquake resistance so as to protect the valve and the pipe against vibration in case of an earthquake. Thus, various valves and pipes of a nuclear plant are provided with a support, as described in Japanese Patent Application Publication No. 61-39559, for example, the entire content of which is incorporated herein by reference.

BRIEF DESCRIPTION OF THE DRAWINGS

The above and other features and advantages of the present invention will become apparent from the discussion hereinbelow of specific, illustrative embodiments thereof presented in conjunction with the accompanying drawings, in which.

DETAIL DESCRIPTION

The PCV may be thermally expanded with a difference in temperature between reactor operation time and reactor shutdown time. At the same time, the TIP guide tube may be thermally expanded in an axial direction thereof which is an extending direction. Application of the support described in the above cited Japanese Patent Application Publication No. 61-39559 to the traversing incore probe valve may cause displacement of the traversing incore probe valve with respect to the support with the difference in temperature between reactor operation time and reactor shutdown time to cause a load on the pipe or valve.

An object of the embodiments of the present invention is to provided a traversing incore probe valve support capable of supporting the traversing incore probe valve while allowing the axial direction displacement of the TIP guide tube.

According to an aspect of the present invention, there is provided a traversing incore probe valve support comprising: a valve bed fixed to a traversing incore probe valve provided in a traversing incore probe guide tube extending to outside of a reactor containment vessel; a stand provided on a floor surface outside the reactor containment vessel; and a displacement allowing member that connects the stand and valve bed in such a manner that they can be displaced in an axial direction of the traversing incore probe guide tube.

Now, embodiments of the present invention will be described referring to the attached drawings.

First Embodiment (Configuration)

Hereinafter, a traversing incore probe valve support according to a first embodiment of the present invention will be described with reference to FIGS. 1, 2, and 11.

Figure 11:
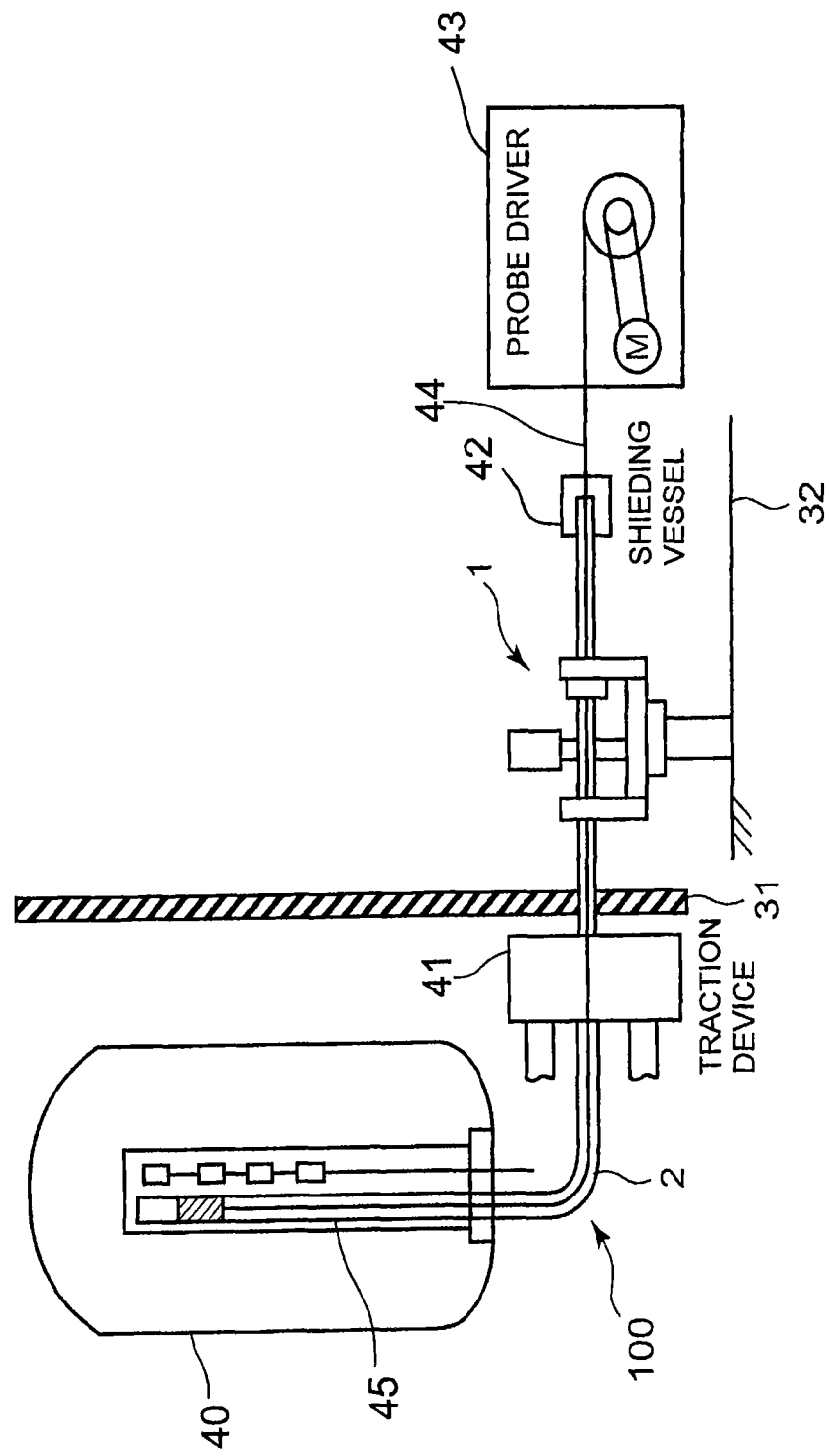
FIG. 11 is a schematic configuration view illustrating a traversing incore probe system.

FIG. 11 is a schematic configuration view illustrating a traversing incore probe system. A TIP (Traversing Incore Probe) guide tube 2 of a TIP (Traversing Incore Probe) system 100 is inserted into a reactor pressure vessel 40, passes through a traction device 41, and penetrates a side surface of a PCV (Primary Containment Vessel) 31 to extend to outside of the PCV 31. At a time other than the measurement time of neutron, a traversing probe is made to stand by in a shielding vessel 42 of FIG. 13 outside the PCV 31. During the neutron measurement time, a TIP drive cable 44 is fed by a probe driver 43 and fed back to move the traversing probe in a TIP guide tube 2 and a calibration conduit 45 in the reactor pressure vessel 40. In FIG. 1, only one of a plurality of TIP guide tubes 2 is illustrated as a representative example.

Figure 1:
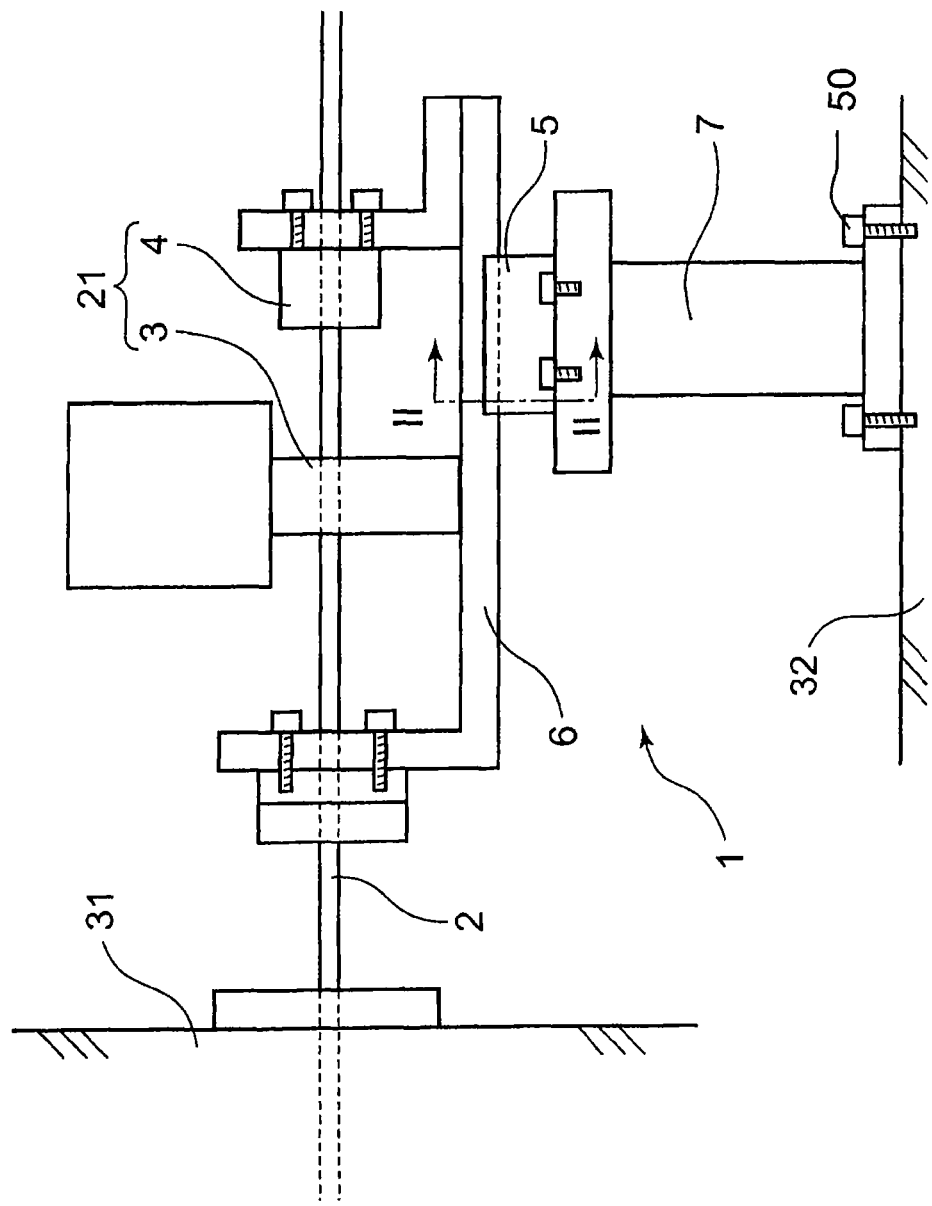
FIG. 1 is a schematic side view illustrating a traversing incore probe valve support according to a first embodiment of the present invention.

FIG. 1 is a schematic side view illustrating the traversing incore probe valve support according to the first embodiment of the present invention. In the TIP guide tube 2 extending to outside of the PCV 31, a TIP isolation valve 3 (or a purge isolation valve) and a TIP shutoff valve 4 (or a check valve) are provided. The TIP isolation valve 3 is automatically or manually operated to close/open the TIP guide tube 2. The TIP shutoff valve 4 disconnects or shuts off the TIP guide tube 2 in case where the TIP drive cable 44 cannot be pulled out at time of use of the TIP, to maintain isolation performance of the PCV 31. Further, a check valve allowing circulation of substance only in one direction may be provided. Hereinafter, the TIP isolation valve 3 and TIP shutoff valve 4 are collectively referred to as a traversing incore probe valve 21.

A traversing incore probe valve support 1 includes a displacement allowing member 5, a valve bed 6, and a stand 7. The stand 7 is fixed by, e.g., bolts 50 to a floor surface 32 below the TIP guide tube 2. The valve bed 6 is fixed to the traversing incore probe valve 21. The valve bed 6 is formed into, e.g., a rectangular flat plate shape horizontally elongated in an extending direction of the TIP guide tube 2 and sandwiching, from both ends thereof in the axial direction of the TIP guide tube 2, the TIP isolation valve 3 and TIP shutoff valve 4 which are provided on an upper surface thereof. The valve bed 6 may further be fixed to the TIP guide tube 2.

The displacement allowing member 5 connects the stand 7 and valve bed 6 in such a manner that they can slide against each other in the axial direction of the TIP guide tube 2.

Figure 2:
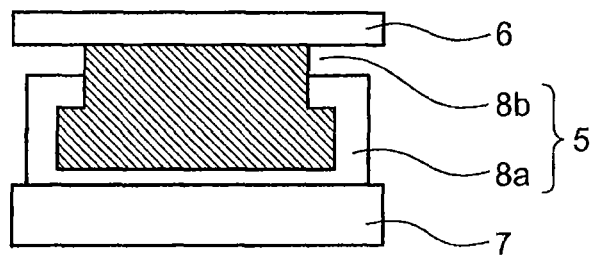
FIG. 2 is a schematic sectional elevation illustrating a displacement allowing member of the traversing incore probe valve support according to the first embodiment of the present invention.

FIG. 2 is a cross-sectional view taken along a long dashed dotted line II-II of FIG. 1 and is more specifically a schematic sectional elevation illustrating the displacement allowing member of the traversing incore probe valve support according to the first embodiment of the present invention. The displacement allowing member 5 has a lower slide rail 8a provided on the stand 7 and an upper slide rail 8b provided on the valve bed 6.

The upper slide rail 8b is a rail having an inverted T-shaped cross-section in a direction perpendicular to a longitudinal direction thereof. The lower slide rail 8a has a shape having a hollowed groove of an inverted T-shaped cross-section in a direction perpendicular to a longitudinal direction thereof, into which the upper slide rail 8b can be inserted.

Insertion of the upper slide rail 8b into the lower slide rail 8a formed integrally with the stand 7 allows the valve bed 6 and the upper slide rail 8b to slide in the axial direction of the TIP guide tube 2 while restrains their lateral movements in perpendicular directions with respect to the axial direction of the TIP guide tube 2.

(Operation and Function)

Operation and function of the first embodiment will be described.

When a displacement occurs in the TIP guide tube 2 due to thermal expansion in the axial direction thereof, the valve bed 6 moves integrally with the traversing incore probe valve 21. At this time, the lower slide rail 8a of the displacement allowing member 5 slides against the upper slide rail 8b in the axial direction of the TIP guide tube 2, thereby absorbing the displacement in the TIP guide tube 2 caused by thermal expansion in the axial direction thereof. Further, the upper slide rail 8b is inserted into the hollowed groove of the lower slide rail 8a and is thus supported in a lateral directions that are perpendicular to the axial direction of the TIP guide tube 2, whereby earthquake resistance support at time of occurrence of vibration such as earthquake is provided.

(Effect)

According to the first embodiment of the present embodiment, it is possible to realize earthquake resistance support for the traversing incore probe valve 21 while alleviating a load on the TIP guide tube 2 and traversing incore probe valve 21 by allowing the displacement in the TIP guide tube 2 caused due to thermal expansion in the axial direction thereof and restraining the vertical movement with respect to the axial direction of the TIP guide tube 2.

Second Embodiment (Configuration)

Hereinafter, the traversing incore probe valve support according to a second embodiment of the present invention will be described with reference to FIGS. 3 and 4. The same reference symbols are given to the same parts as those of the traversing incore probe valve support according to the first embodiment, and descriptions of the same configurations will be omitted.

Figure 3:
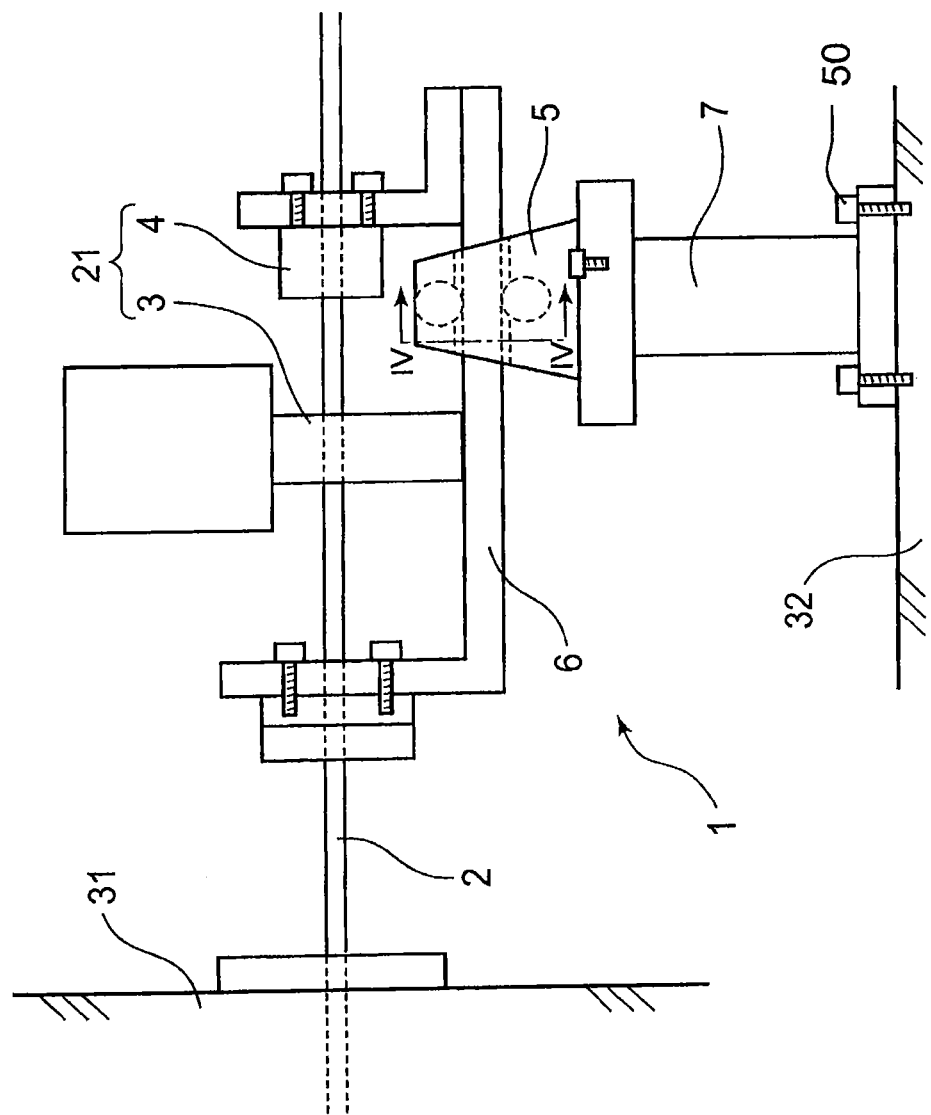
FIG. 3 is a schematic side view illustrating the traversing incore probe valve support according to a second embodiment of the present invention.
Figure 4:
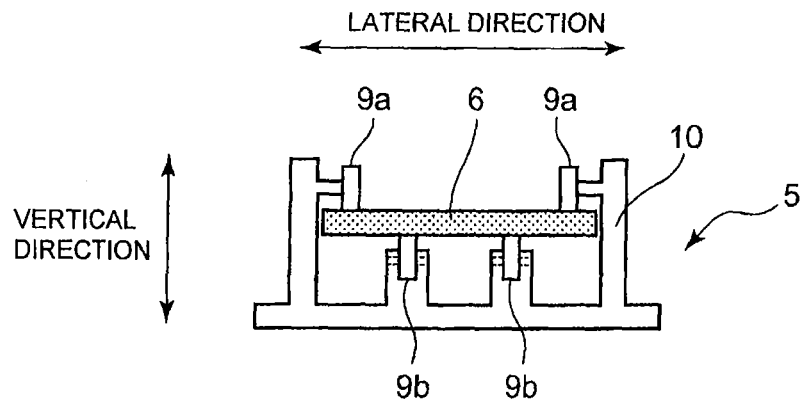
FIG. 4 is a schematic sectional elevation illustrating the displacement allowing member of the traversing incore probe valve support according to the second embodiment of the present invention.

FIG. 3 is a schematic side view illustrating the traversing incore probe valve support according to the second embodiment of the present invention. FIG. 4 is a cross-sectional view taken along a long dashed dotted line IV-IV of FIG. 3 and is more specifically a schematic sectional elevation illustrating the displacement allowing member of the traversing incore probe valve support according to the second embodiment of the present invention.

The displacement allowing member 5 includes an upper displacement allowing member 9a contacting an upper surface of the valve bed 6 having a rectangular flat plate shape, lower displacement allowing members 9b contacting a lower surface of the valve bed 6, and a displacement allowing member support mechanism 10 supporting the upper displacement allowing member 9a and the lower displacement allowing members 9b.

Owing to the structure in which the valve bed 6 is inserted between the upper displacement allowing member 9a and the lower displacement allowing members 9b, vertical movement of the valve bed 6 is restrained. Likewise, owing to the displacement allowing member support mechanism 10, lateral movement of the valve bed 6 is restrained.

(Operation and Function)

Operation and function of the second embodiment will be described.

When a displacement occurs in the TIP guide tube 2 due to thermal expansion in the axial direction thereof, the valve bed 6 is displaced in the axial direction of the TIP guide tube 2 while being sandwiched between the upper displacement allowing member 9a and the lower displacement allowing members 9b. Further, by forming each of the upper and the lower displacement allowing members 9a and 9b into a roller rotating in the axial direction of the TIP guide roller 2 in contact with the valve bed 6, the valve bed 6 can be displaced more smoothly.

(Effect)

According to the second embodiment of the present embodiment, it is possible to realize earthquake resistance support for the traversing incore probe valve 21 while alleviating a load on the TIP guide tube 2 and traversing incore probe valve 21 by the structure sandwiching the valve bed 6 with the upper displacement allowing member 9a and the lower displacement allowing members 9b and allowing the sliding movement of the valve bed 6 in the axial direction of the TIP guide tube 2.

Third Embodiment (Configuration)

Hereinafter, the traversing incore probe valve support according to a third embodiment of the present invention will be described with reference to FIGS. 5 and 6. The same reference symbols are given to the same parts as those of the traversing incore probe valve support according to the second embodiment, and descriptions of the same configurations will be omitted.

Figure 5:
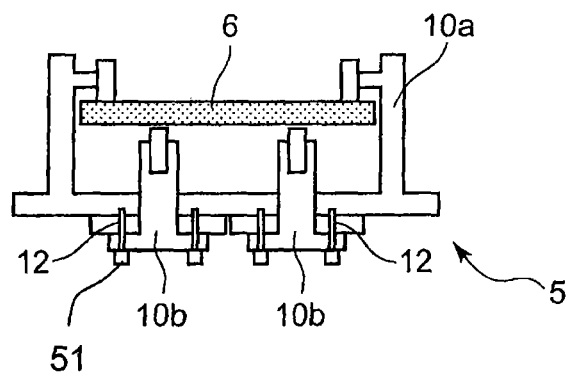
FIG. 5 is a schematic sectional elevation illustrating the displacement allowing member of the traversing incore probe valve support according to a third embodiment of the present invention.
Figure 6:
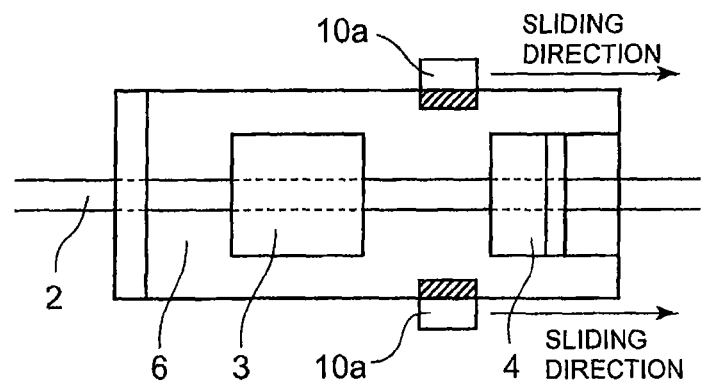
FIG. 6 is a schematic top view illustrating the traversing incore probe valve support according to the third embodiment of the present invention.

FIG. 5 is a schematic sectional elevation illustrating the displacement allowing member of the traversing incore probe valve support according to the third embodiment of the present invention. FIG. 6 is a schematic top view illustrating the traversing incore probe valve support according to the third embodiment of the present invention. FIG. 6 illustrates a slide direction along which the displacement allowing member 5 of the traversing incore probe valve support 1 is removed from the valve bed 6.

The displacement allowing member support mechanism 10 according to the present embodiment differs from that according to the second embodiment in that it has a configuration in which an upper displacement allowing member mechanism 10a provided at the upper portion of the valve bed 6 and a lower displacement allowing member mechanisms 10b provided at the lower portion of the valve bed 6 can be separated from each other. The upper displacement allowing member mechanism 10a and the lower displacement allowing member mechanisms 10b are fixed to each other by, e.g., bolts 51 through height adjustment spacers 12.

(Operation and Function)

Operation and function of the third embodiment will be described.

At maintenance time of the traversing incore probe valve 21, the bolts 51 fixing the upper displacement allowing member mechanism 10a and the lower displacement allowing member mechanisms 10b at the lower portion of the valve bed 6 are removed to separate the upper displacement allowing member mechanism 10a, the lower displacement allowing member mechanisms 10b, and the height adjustment spacers 12 from each other.

After the separation, the upper displacement allowing member mechanism 10a is slid in the axial direction of the TIP guide tube 2 to be removed from the valve bed 6, thereby facilitating the maintenance of the traversing incore probe valve 21. Further, adjusting a thickness of the height adjustment spacers 12 allows adjustment of restraint strength of the valve bed 6 by the upper displacement allowing member mechanism 10a and the lower displacement allowing member mechanisms 10b.

(Effect)

According to the third embodiment of the present invention, separating the upper displacement allowing member mechanism 10a and the lower displacement allowing member mechanisms 10b from each other makes it easy to remove the traversing incore probe valve support 1 from the traversing incore probe valve 21.

Fourth Embodiment (Configuration)

Hereinafter, the traversing incore probe valve support according to a fourth embodiment of the present invention will be described with reference to FIGS. 7 and 8. The same reference symbols are given to the same parts as those of the traversing incore probe valve support according to the first embodiment, and descriptions of the same configurations will be omitted.

Figure 7:
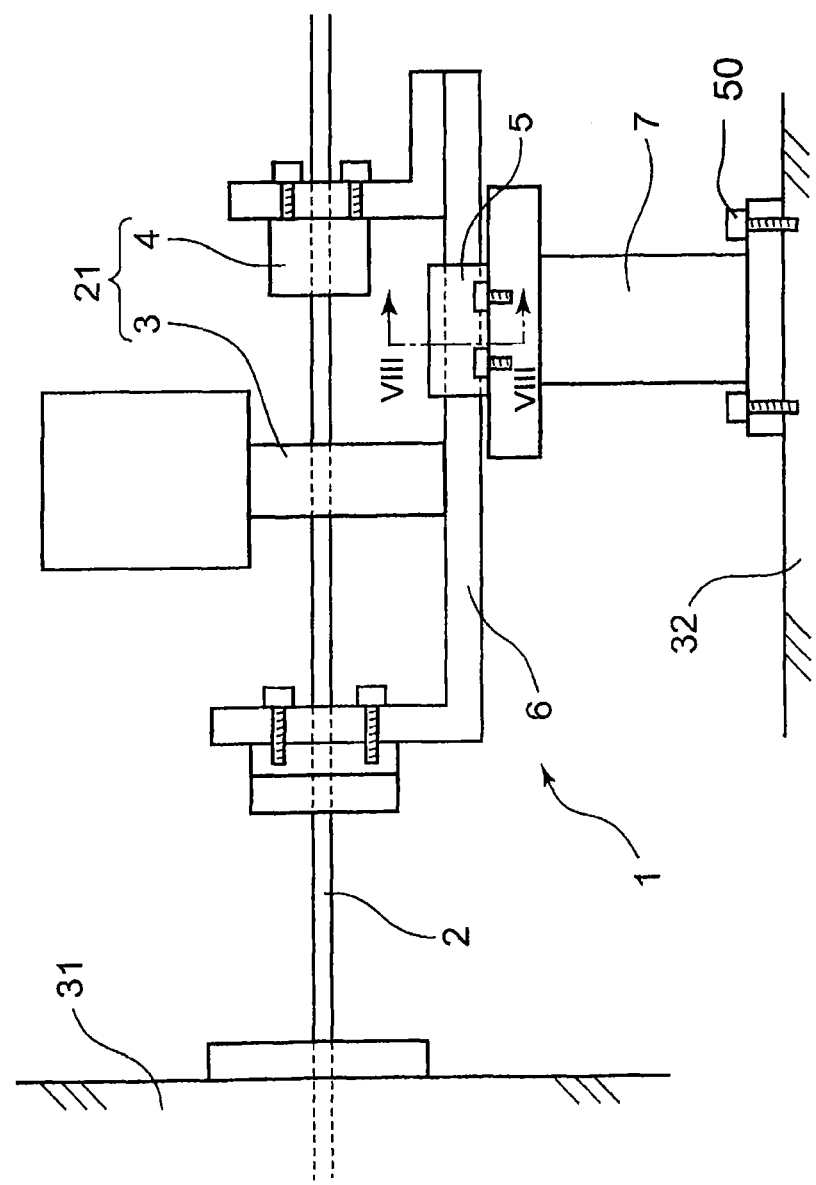
FIG. 7 is a schematic side view illustrating the traversing incore probe valve support according to a fourth embodiment of the present invention.
Figure 8:
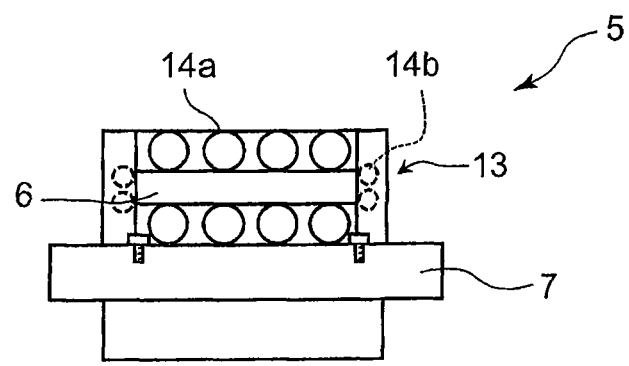
FIG. 8 is a schematic sectional elevation illustrating the displacement allowing member of the traversing incore probe valve support according to the fourth embodiment of the present invention.

FIG. 7 is a schematic side view illustrating the traversing incore probe valve support according to the fourth embodiment of the present invention. FIG. 8 is a cross-sectional view taken along a long dashed dotted line VIII-VIII of FIG. 7 and is more specifically a schematic sectional elevation illustrating the displacement allowing member of the traversing incore probe valve support according to the fourth embodiment of the present invention. The displacement allowing member 5 according to the present embodiment has a configuration using a roll bearing 13.

The roll bearing 13 is provided on the stand 7 and has a square tubular shape into which the valve bed 6 can be inserted. The roll bearing 13 has balls 14a sandwiching the valve bed 6 having a rectangular flat plate shape in the vertical direction and rolling in contact with the valve bed 6. The roll bearing 13 may further have balls 14b sandwiching the valve bed 6 in the horizontal direction and rolling in contact with the valve bed 6. The roll bearing 13 restrains vertical and horizontal direction movement of the valve bed 6.

(Operation and Function)

Operation and function of the fourth embodiment of the present invention will be described.

When a displacement occurs in the TIP guide tube 2 due to thermal expansion in the axial direction thereof, the balls 14a and 14b contact the valve bed 6 and rotate to allow smooth displacement in the axial direction. As a result, the roll bearing 13 only allows sliding movement in the axial direction of the TIP guide tube 2, thereby allowing absorption of the displacement of the TIP guide tube 2 due to the thermal expansion in the axial direction thereof.

A configuration may be adopted, in which the roll bearing 13 is provided at the valve bed 6 side so as to make the balls 14a and 14b of the roll bearing 13 contact the stand 7. Further, in the first embodiment in which the slide rails are used for the sliding movement, the balls 14 may be provided so as to contact only the lower slide rails 8a or only the upper slide rails 8b. This makes the sliding movement of the other slide rail smoother.

(Effect)

According to the fourth embodiment of the present invention, it is possible to realize earthquake resistance support for the traversing incore probe valve 21 while alleviating a load on the TIP guide tube 2 and traversing incore probe valve 21 by the structure sandwiching the valve bed 6 with the roll bearing 13 as the displacement allowing member 5, by allowing the sliding movement of the valve bed 6 in the axial direction of the TIP guide tube 2.

Fifth Embodiment (Configuration)

Hereinafter, the traversing incore probe valve support according to a fifth embodiment of the present invention will be described with reference to FIG. 9. The same reference symbols are given to the same parts as those of the traversing incore probe valve support according to the first embodiment, and descriptions of the same configurations will be omitted.

Figure 9:
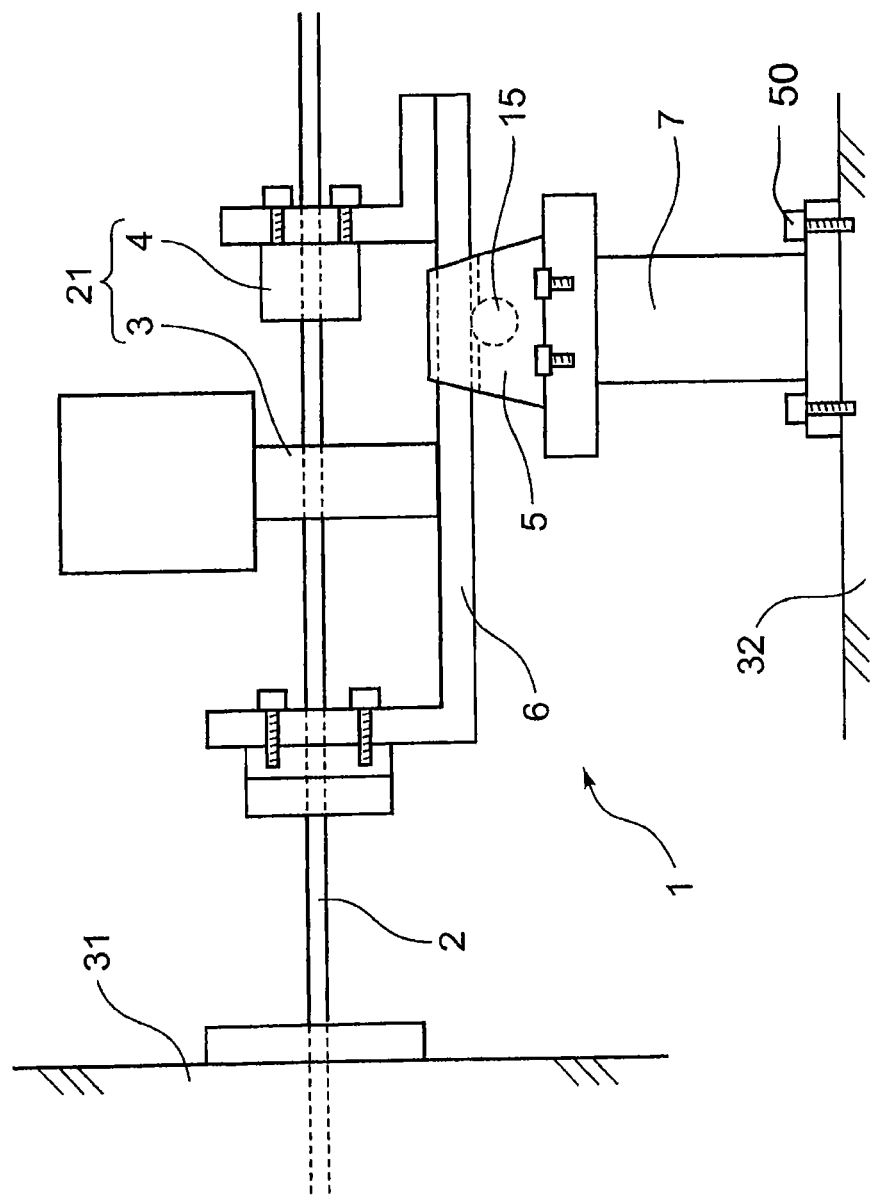
FIG. 9 is a schematic side view illustrating the traversing incore probe valve support according to a fifth embodiment of the present invention.

FIG. 9 is a schematic side view illustrating the traversing incore probe valve support according to the fifth embodiment of the present invention. In the present embodiment, the displacement allowing member 5 according to the first, second, or third embodiment is provided with a roller 15. The roller 15 can rotate in the axial direction of the TIP guide tube 2 in contact with the valve bed 6 inserted into the displacement allowing member 5.

(Operation and Function)

Operation and function of the fifth embodiment of the present invention will be described.

When a displacement occurs in the TIP guide tube 2 due to thermal expansion in the axial direction thereof, the valve bed 6 is displaced with respect to the displacement allowing member 5. The roller 15 rotates in the axial direction of the TIP guide tube 2 in contact with the valve bed 6, thereby allowing smooth displacement of the valve bed 6.

Alternatively, a configuration may be adopted, in which the roller 15 is provided at the valve bed 6 side so as to make the roller 15 contact the stand 7. Further, in the first embodiment in which the lower slide rail 8a and the upper slide rail 8b are used for the sliding movement, the roller 15 may be provided so as to contact one of the lower and the upper slide rails 8a and 8b. This makes the mutual sliding movement of the lower slide rail 8a and the upper slide rail 8b smoother.

(Effect)

According to the fifth embodiment of the present invention, it is possible to realize earthquake resistance support for the traversing incore probe valve 21 while alleviating a load on the TIP guide tube 2 and the traversing incore probe valve 21 by making smoother the sliding movement of the valve bed 6 in the axial direction of the TIP guide tube 2 by means of the roller 15.

Sixth Embodiment (Configuration)

Hereinafter, the traversing incore probe valve support according to a sixth embodiment of the present invention will be described with reference to FIG. 10. The same reference symbols are given to the same parts as those of the traversing incore probe valve support according to the first embodiment, and descriptions of the same configurations will be omitted.

Figure 10:
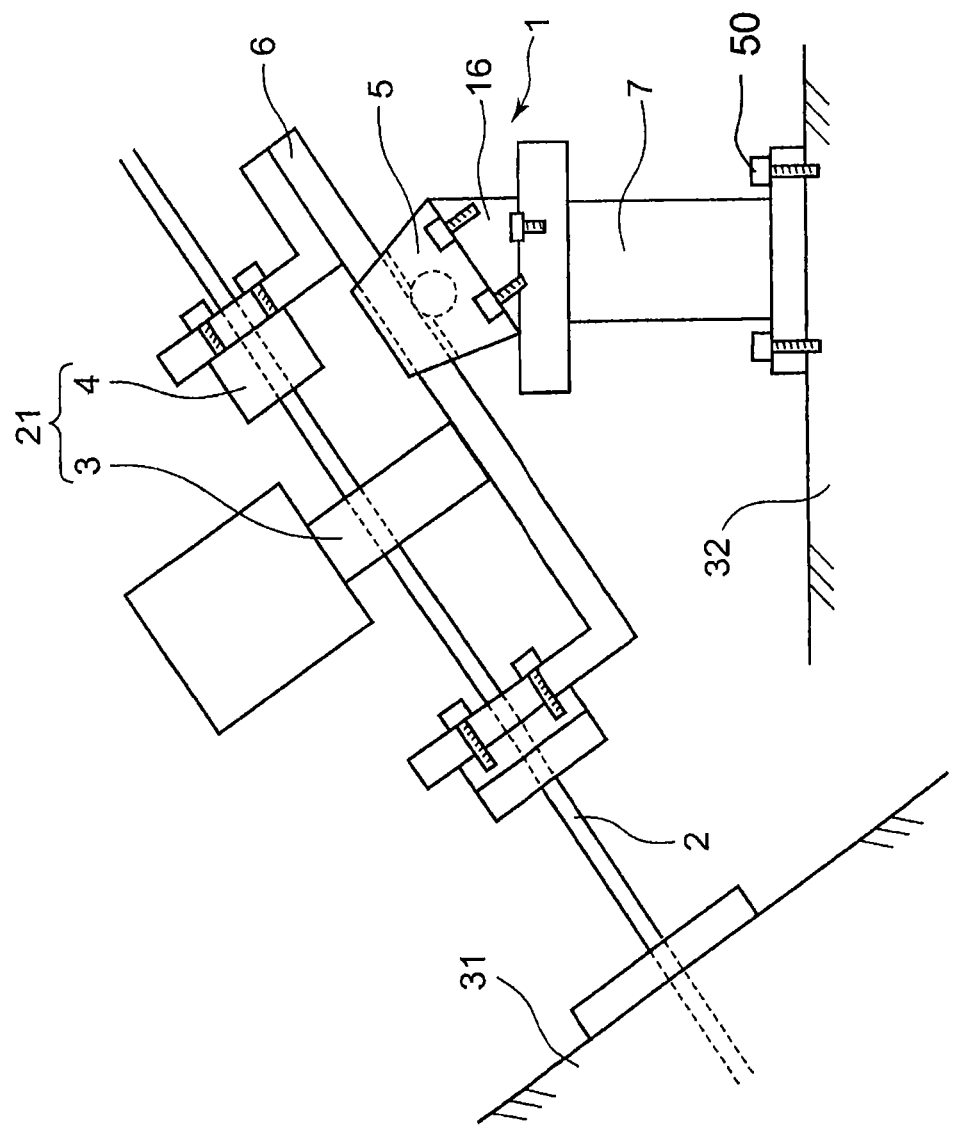
FIG. 10 is a schematic side view illustrating the traversing incore probe valve support according to a sixth embodiment of the present invention.

FIG. 10 is a schematic side view illustrating the traversing incore probe valve support according to the sixth embodiment of the present invention. In the six embodiment, the displacement allowing member 5 according to the first, second, third, fourth, or fifth embodiment is provided with an angle adjustment spacer 16.

There may be a case where the TIP guide tube 2 penetrates the PCV 21 to extend outward at a predetermined angle. An angle of the displacement allowing member 5 is adjusted using the angle adjustment spacer 16 such that the TIP guide tube 2 can be displaced at a predetermined angle.

(Operation and Function)

Operation and function of the sixth embodiment will be described.

When a displacement occurs in the TIP guide tube 2 extending at a predetermined angle due to thermal expansion in the axial direction thereof, the thermal expansion of the TIP guide tube 2 occurs also at a corresponding predetermined angle. Since the displacement allowing member 5 is adjusted by the angle adjustment spacer 16 such that it can be displaced at a predetermined angle, the displacement of the traversing incore probe valve 21 in the axial direction is allowed, whereby earthquake resistance support in the vertical direction with respect to the axial direction of the TIP guide tube 2 is provided.

(Effect)

According to the sixth embodiment of the present invention, it is possible to adjust an installation angle of the displacement allowing member 5 depending on an installation angle of the TIP guide tube 2 and the traversing incore probe valve 21 by using the angle adjustment spacer 16.

Other Embodiments

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A traversing incore probe valve support comprising:
    a valve bed fixed to a traversing incore probe valve provided in a traversing incore probe guide tube extending through a reactor pressure vessel and a reactor containment vessel containing the reactor pressure vessel, the valve bed being disposed outside the containment vessel;
    a stand for supporting the valve bed, the stand being provided on a floor surface outside the reactor containment vessel; and
    a displacement allowing member that connects the stand and the valve bed in such a manner that they can be displaced in an axial direction of the traversing incore probe guide tube for allowing thermal expansion of the incore probe guide tube, and that the stand can support the bed in a lateral direction perpendicular to the axial direction of the traversing incore probe guide tube.

2. The traversing incore probe valve support according to claim 1, wherein
    the valve bed is inserted into the displacement allowing member so as to be slidable to restrain movement of the valve bed in such a manner that the valve bed can be displaced in the axial direction.

3. The traversing incore probe valve support according to claim 2, wherein
    the displacement allowing member includes, in a separable manner, an upper displacement allowing member support mechanism provided at an upper portion of the valve bed, and a lower displacement allowing member support mechanism provided at a lower portion of the valve bed.

4. A traversing incore probe system in which the traversing incore probe valve is supported by the traversing incore probe valve support as claimed in claim 1.

* * * * *